(12) United States Patent
Burns

(10) Patent No.: US 7,339,890 B2
(45) Date of Patent: Mar. 4, 2008

(54) SCALABLE, HIGH-RESOLUTION ASYNCHRONOUS TRANSFER MODE TRAFFIC SHAPER AND METHOD

(75) Inventor: Daniel J Burns, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 1155 days.

(21) Appl. No.: 10/195,528

(22) Filed: Jul. 16, 2002

(65) Prior Publication Data

US 2003/0147399 A1 Aug. 7, 2003

Related U.S. Application Data

(60) Provisional application No. 60/352,875, filed on Feb. 1, 2002.

(51) Int. Cl.
*G01R 31/08* (2006.01)
(52) U.S. Cl. .................................. 370/230.1
(58) Field of Classification Search ................. None
See application file for complete search history.

(56) References Cited

U.S. PATENT DOCUMENTS

| | | | | |
|---|---|---|---|---|
| 6,044,060 A | * | 3/2000 | Jones | ............... 370/230.1 |
| 6,483,839 B1 | * | 11/2002 | Gemar et al. | ........... 370/395.42 |
| 7,117,963 B2 | | 2/2007 | Burns et al. | |
| 2003/0031131 A1 | * | 2/2003 | Bottiglieri et al. | ........... 370/235 |
| 2003/0147349 A1 | | 8/2003 | Burns | |

* cited by examiner

*Primary Examiner*—Doris H. To
*Assistant Examiner*—Christopher Grey
(74) *Attorney, Agent, or Firm*—Sterne, Kessler, Goldstein & Fox PLLC

(57) ABSTRACT

An ATM network traffic shaper is implemented in hardware. The traffic shaper shapes transmit data on one or more virtual circuits (VCs) according to the specified quality of service (QoS) parameters. Thus, the traffic shaper provides for the delivery of associated data cells in accordance with the specified QoS parameters. The traffic shaper is scalable in that the number of supported VCs can be increased with a relatively small increase in the size of the device and associated logic gates. The traffic shaper supports constant bit rate (CBR), variable bit rate (VBR), and unknown bit rate (UBR) service types and generates cell transmit requests with zero cell delay variation (CDVT). The traffic shaper also provides very high resolution in terms of bit rate specification. Varying shaping resolutions are achieved by varying a shaping interval time (SIT) generated by a SIT counter.

29 Claims, 8 Drawing Sheets

SCALABLE, HIGH-RESOLUTION ASYNCHRONOUS TRANSFER MODE TRAFFIC SHAPER AND METHOD

CROSS-REFERENCE TO RELATED APPLICATIONS

This application claims priority to U.S. Prov. Appl. No. 60/352,875 filed Feb. 1, 2002, which is incorporated herein by reference in its entirety.

This application is related to U.S. application Ser. No. 10/195,529 "Communications Systems And Methods Utilizing a Device That Performs Per-service Queuing," filed concurrently herewith, and Ser. No. 10/173,985 entitled "System And Method For Low-Overhead Monitoring Of Transmit Queue Empty Status," filed Jun. 19, 2002, which are incorporated herein by reference in their entirety.

BACKGROUND OF THE INVENTION

1. Field of the Invention

The present invention generally relates to the field of Asynchronous Transfer Mode (ATM) technology. More particularly, the present invention relates to a system and method for shaping and delivering ATM cells in accordance with specified quality of service (QoS) standards.

2. Background Art

An important aspect of ATM network technology is its ability to provide specific levels of QoS for an established virtual circuit (VC) or path between a source and destination. QoS is defined on an end-to-end basis of each VC based on specified parameters corresponding to service type, peak cell rate (PCR), sustained cell rate (SCR), and cell delay variation tolerance (CDVT). Service types define VC cell delivery by a source node and are specified as constant bit rate (CBR), variable bit rate (VBR), or unspecified bit rate (UBR). The PCR is the minimum inter-cell spacing in seconds. The SCR is a maximum average rate cells can be sent at the PCR. The CDVT is a measure of cell clumping or how much more closely or further the cells are spaced than a nominal interval. The CDVT determines the ability to get cells out as close to the scheduled time as possible, where it is desired to have little to no variation. It is the responsibility of the network source node to provide data to the ATM network according to the specified service type, at the specified cell rate, and with minimal variation in the delivery of the cell from the nominal delivery time (or minimal CDVT).

Devices at the end-points of the ATM network are the producers and consumers of data traveling across the ATM network. Devices at the customer end-point are typically referred to as Customer Premise Equipment (CPE). Devices at the service or network provider end-points can fall into one of a number of categories, for example web servers, circuit-switches, and video-streaming servers. In the ATM network, data between a producer and consumer travels across the network over the VC. Each source node in a network will typically have multiple VCs established with one or more destination nodes. In order to communicate across an ATM based network with specific QoS requirements, both provider and CPE devices require a traffic shaper to "shape" transmit traffic on each VC according to the specified QoS parameters established during the VC initialization. Currently, traffic shapers are primarily implemented in software.

Unfortunately, presently available software implemented traffic shapers have a limited ability to handle high bit rate data transmission, which is now in the gigabit per second (Gbps) range. Typically, this is because the processor cannot sustain a normal interrupt rate for high bit rate scheduling. The traffic shaper stores cells before sending them to a scheduler, and cannot release those stored cells until it receives an interrupt signal from the scheduler that the cells have been transmitted on a VC. A lot of overhead must be used in order to handle the quantity of interrupt signals required at Gbps levels of data transmission. This increases the CDVT, which can cause cell buffers to overflow. Also, presently available software implemented traffic shapers are not easily scalable to handle more VCs and cannot achieve desired shaping resolutions over a wide range (kilo bits per second (kbps to Gbps)) of cell bit rates.

Therefore, what is needed is a traffic shaper that can handle a wide range of cell bit rates (kbps to Gbps) and still have little to no CDVT, the ability to be scalable to handle any number of VCs, and the ability to adjust shaping resolution based on bit rate, while maintaining a desired implementation size.

BRIEF SUMMARY OF THE INVENTION

According to embodiments of the invention there is provided a system including a transmit queue that receives data from traffic sources and a traffic shaper coupled to the transmit queue. The traffic shaper includes a shaper controller, a shaper core, parameter storage, and bucket value storage. The shaper core shapes the data to determine if cell requests can be scheduled based the shaper controller accessing quality of service (QoS) parameter values (Pn) in the parameter storage and bucket values (Bn) in the bucket value storage and controlling their transmission to the shaper core. The system further includes a scheduler coupled to the transmit queue and the traffic shaper that schedules transmission of the data to customer premise equipment (CPE) based on receiving signals from the traffic shaper. The system further includes a shaping interval time (SIT) counter coupled to the shaper controller and the shaper core. The SIT counter transmits a signal (SITn) to initiate the accessing of Pn and Bn values by the shaper controller. The system further includes a host controller coupled to the parameter storage and the scheduler that initializes the parameter storage and the scheduler.

According to other embodiments of the invention there is provided a method of performing traffic shaping with a traffic shaper coupled to n VCs. The method includes the steps of a) sequentially receiving n shaping interval time (SITn) signals in a shaper controller and a shaper core in the traffic shaper, b) accessing one parameter value (Pn) per SITn signal from a parameter memory, and c) accessing one bucket value (Bn) per SITn signal from a bucket memory. The method includes the further step of d) performing a leaky bucket algorithm in the shaper core using the Pn value and the transmitted Bn value. The method includes the further steps of e) generating a signal identifying whether a cell request should be granted based on the leaky bucket algorithm and f) generating an updated Bn value in the shaper core based on the leaky bucket algorithm, and g) replacing a current Bn value with the updated Bn value in the bucket memory.

According to other embodiments there is provided a traffic shaper in an asynchronous transfer mode (ATM) network. The traffic shaper includes a shaper controller, a shaper core coupled to the shaper controller, a parameter storage coupled to the shaper controller and the shaper core, and a bucket storage coupled to the shaper controller and the shaper core.

Some advantages of the above system and method include scalability, implementation size resulting in reduced cost, shaping resolution, and zero or substantially zero cell delay variation.

BRIEF DESCRIPTION OF THE DRAWINGS/FIGURES

The accompanying drawings, which are incorporated in and constitute a part of the specification, illustrate an embodiment(s) of the invention and, together with the description, explain the purpose, advantages, and principles of the invention. In the drawings, like reference numbers indicate the same or substantially the same elements. Furthermore, the left-most digit(s) of the reference numbers indicate the number of the drawing in which the reference number is first used.

DETAILED DESCRIPTION OF THE INVENTION

Embodiments of the present invention provide a traffic shaper in an ATM network that can be a hardware or software implementation. Hardware can include digital state machines, logic devices, processors, or the like. The traffic shaper implements an algorithm, which can be a Dual Reverse Leaky Bucket algorithm, that has the ability to vary the QoS parameters for each VC, and has scalability to accommodate any number VCs. Thus, through either hardware or software implementation of the traffic shaper, scalability, implementation size, shaping resolution, and zero or substantially zero cell delay variation are achieved.

The traffic shaper allows the number of supported VCs to be easily increased through use of minimal additional storage for each additional VC and by adjusting the VC_ADDR bus width accordingly. The additional storage required for each additional VC is equal to the size of the shaping parameters storage and bucket storage. Scalability comes from the way the traffic shaper utilizes a single shaper core, while having a parameter storage and bucket value storage with n memory locations, one for each n VC. Therefore, to grow the number of VCs, the only thing that expands is the parameter storage and bucket storage memories.

The implementation size of the traffic shaper can be realized with a small amount of logic. This is done by using a single shaper core for all of the VCs, which facilitates the growth without significantly growing the size of the traffic shaper.

Shaping resolution is achieved with proper selection of the shaping interval time (SIT), PCR and SCR parameters, and bucket size. The traffic shaper is capable of achieving very fine resolution of the desired bit rate (as low as 0.05% of the link rate). Shaping resolution can be varied because the SIT counter has the ability to vary the SIT signal or pulse. The SIT signal controls the cell scheduling resolution with more frequent occurrence of the SIT (lower SIT count value) resulting in final scheduling resolution. Also, the size (number of bits) for each of the PCR and SCR parameters stored in the parameter storage determines the range of accommodated cell rates. The bigger the parameter, the lower the supported bit rate. In other words, shaping resolution can be varied for various bit rates so that greater resolution can be achieved for lower bit rates.

Finally, substantially zero Cell Delay Variation Tolerance (CDVT) is achieved. When utilizing the hardware implementation of the shaping core, the traffic shaper will generate cell requests with no variation in time from the previous request. This process is improved in-part because the present embodiments of the traffic shaper minimize the cell delay variation tolerance (CDVT). When utilizing the hardware implementation of the shaping core, the traffic shaper will generate cell requests with substantially no variation in time from the previous request, thus achieving substantially zero CDVT.

Figure 1A:
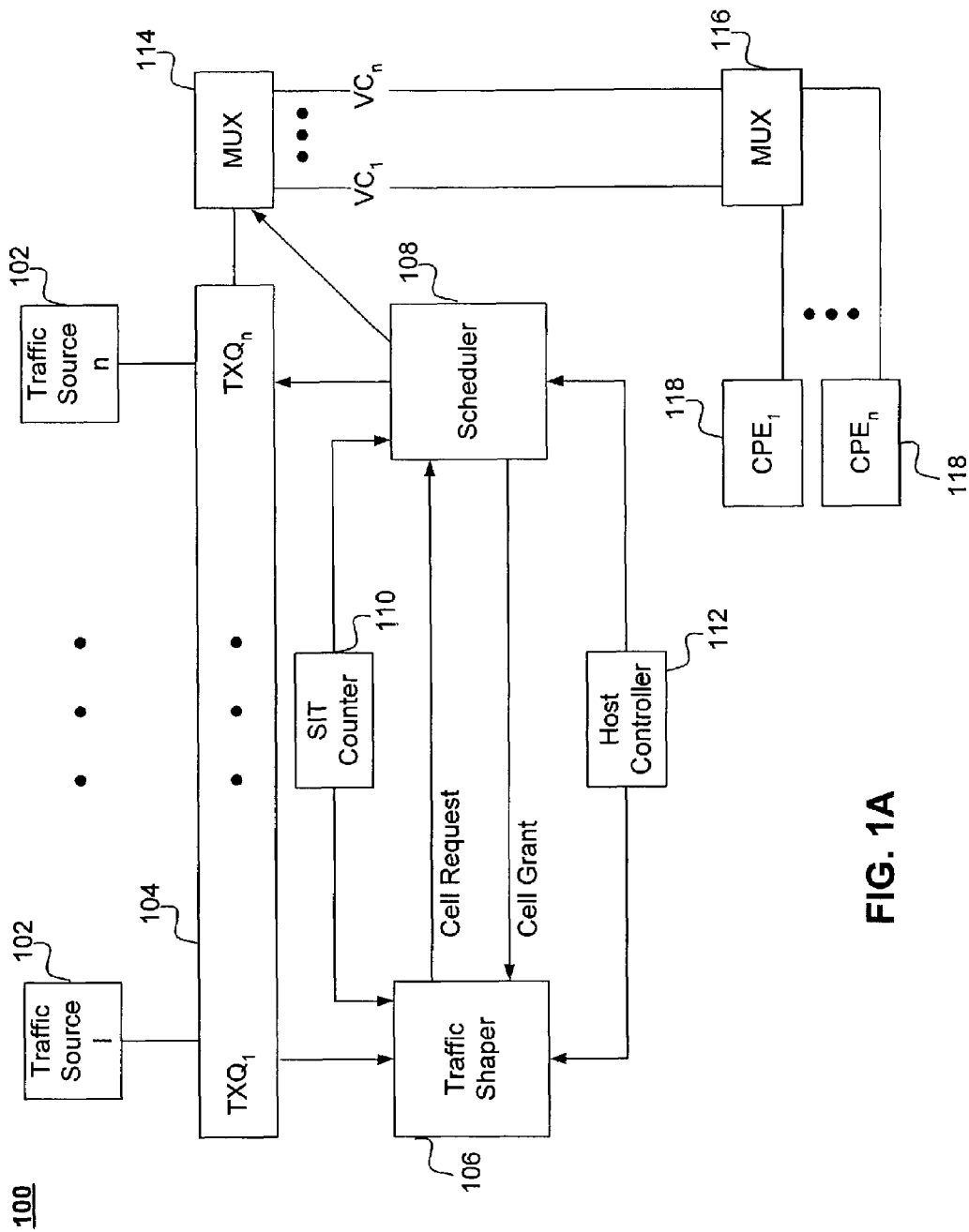
FIG. 1A is a block diagram view of a portion of an Asynchronous Transfer Mode (ATM) network according to embodiments of the present invention.

FIG. 1A illustrates an ATM network 100 according to embodiments of the present invention. The network 100 includes traffic sources 102 that are coupled to a transmit queue 104, which in turn is coupled to a traffic shaper 106 and a scheduler 108. The shaper 106 and the scheduler 108 are coupled to a shaper interval time (SIT) counter 110, which can be a programable counter, and a host controller 112, as well as being coupled to each other. A transmit or first multiplexer 114 is coupled to the transmit queue 104 and the scheduler 108. The first multiplexer 114 controls signals sent along n (n=is a positive integer from 1 to m) VCs to a receive or second multiplexer 116. Finally, the second multiplexer 116 is coupled to a plurality of customer premise equipment (CPEs) 118.

Figure 1B:
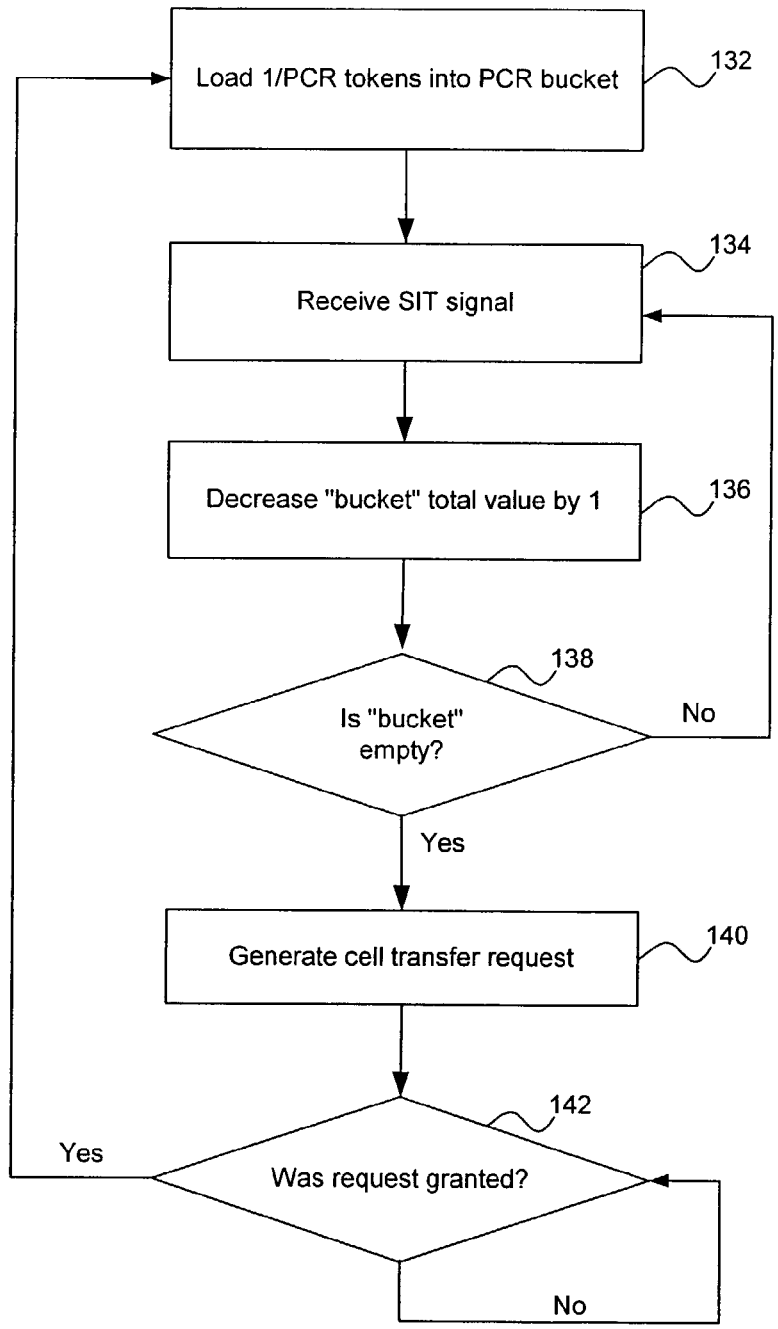
FIGS. 1B and 1C are flow charts showing leaky bucket algorithms according to embodiments of the present invention.
Figure 1C:
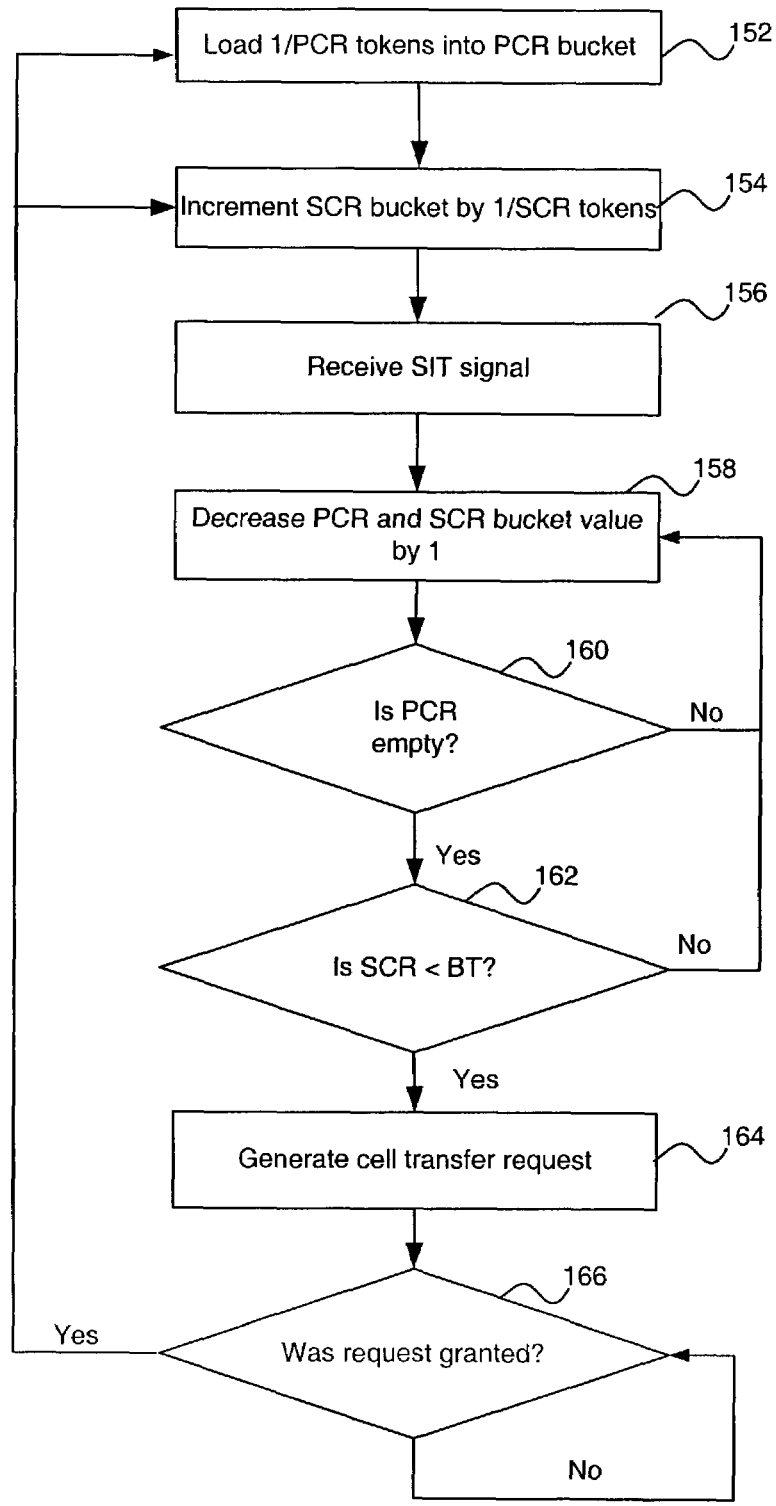
Figure 2:
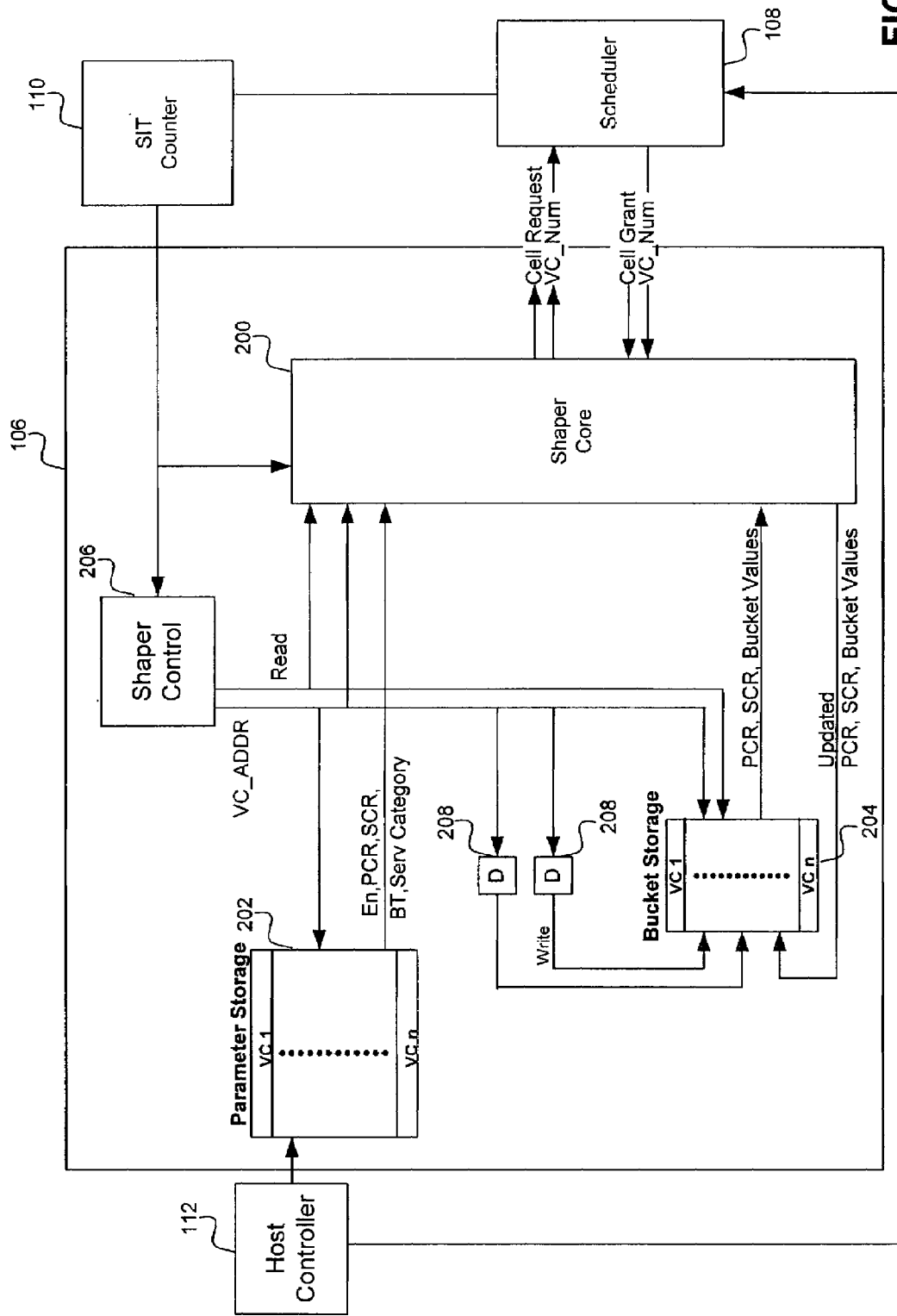
FIG. 2 is a block diagram view of a transmit traffic shaping device in the ATM network of FIG. 1A according to embodiments of the present invention.

Turning now to FIGS. 1B-1C and 2, with continuing reference to FIG. 1A, a constant bit rate (CBR) leaky bucket operation 130 (e.g., a reverse leaky bucket operation) is shown in FIG. 1B and a variable bit rate (VBR) leaky bucket operation 150 (e.g, a dual reverse leaky bucket operation) is shown in FIG. 1C. The traffic shaper 106 performs the leaky bucket operations to regulate when cell transfer requests are sent to the scheduler 108.

As seen in FIG. 1B, when performing the CBR leaky bucket operation 130, only one bucket in a bucket storage 204 in the traffic shaper 106 is used, which is called the peak cell rate (PCR) bucket. At step 132, the PCR bucket is filled with 1/PCR tokens (a token is similar to one count value in a counter). At step 134, a SIT signal is received from the SIT counter 110 at the traffic shaper 106. At step 136, the PCR bucket value is reduced by 1, which means that one token has leaked from the bucket. A determination is made at step 138 whether the PCR bucket is empty. If no, the method returns to step 134. If yes, a cell transfer request is generated at step 140. At step 142, a determination is made whether the cell transfer request was granted. If no, the method 130 continues to check if the request was granted. If the request is granted, then the PCR bucket is refilled with the number of tokens equal to 1/PCR.

As seen in FIG. 1C, when performing the VBR leaky bucket operation 150, two buckets in the bucket storage 204 in the traffic shaper 106 are used, which are called the peak cell rate (PCR) and sustained cell rate (SCR) buckets. At step 152, the PCR bucket is loaded with 1/PCR tokens. At step 154, the SCR bucket is loaded so that it holds 1/SCR tokens. At step 156, a SIT signal is received from the SIT counter 110 at the traffic shaper 106. At step 158, the PCR and SCR buckets values are reduced by 1. At step 160, a determination is made whether the PCR bucket is empty. If no, the method 150 returns to step 156. If yes, a determination is made at step 162 whether the SCR bucket value is less than the burst tolerance (BT). If no, the method 150 returns to step 156. If yes, at step 164 a cell transfer request is generated. At step 166, a determination is made whether the request was granted. If no, the method 150 continues to check if the request was granted. If yes, the PCR bucket is refilled with 1/PCR tokens at step 152 and 1/SCR tokens are added to the current contents of the SCR bucket at step 154.

FIG. 2 illustrates a detailed view of the shaper 106 is shown. The above described leaky bucket algorithm is performed in a shaper core 200. The shaper core 200 performs this algorithm based on receiving: (1) QoS parameters from aparameter storage 202, which is used to store n QoS parameters (Pn), (2) bucket values (Bn) from a bucket storage 204; and (3) periodic n SIT signals (SITn) from the SIT counter 110. As described above, the bucket values (Bn) represent the number of tokens in the PCR and SCR buckets before and after each SIT signal. The parameter storage 202 and the bucket storage 204 can be look-up tables, or the like. The SIT counter 110 can be a programable counter and is adjustable in terms of spacing between count signals to adjust the shaping resolution, as discussed above.

With continuing reference to FIG. 2, a shaper control 206 also receives the SITn signal, and utilizes it to access the corresponding Pn value from the parameter storage 202 and Bn value from the bucket storage 204, which correspond to one of the n VCs a cell can be transmitted on. The shaper core 200 then receives the accessed Pn from the parameter storage 202 and the accessed Bn from the bucket storage 204. These values are used to execute the reverse leaky bucket algorithm or the dual reverse leaky bucket algorithm. The shaper core also writes the updated bucket value Bn to the bucket storage 204. In essence, the shaper core 200 keeps track of when the last time a cell was scheduled for transmission on the VCn, and whether it is time to schedule another cell for transmission on the VCn. Once a cell is transmitted, the shaper core 200 initiates a counter and monitors it to see if it has reached a predetermined value to determine if it is time to send another cell on a particular VCn.

The host controller 112 initializes entries in the parameter storage 202 for each active VC with the shaping parameters defined in Table 1 below. Once the traffic shaper 106 is enabled, a pulse is generated by the SIT counter 110 and transmitted to the SIT input of the shaper control 206 and the shaper core 200 at the start of each shaping interval, which starts the shaping process. The shaper control 206 will output sequential addresses on the VC_ADDR lines in order to sequentially access each Pn entry (En, PCR, SCR, BT, QoS Category) in the parameter storage 202 along with each of the current bucket values Bn (PCR bucket value and SCR bucket value) from the bucket storage 204. A signal from the shaper control 206 is received by the bucket storage 204 both directly and after passing through delays 208. These accessed values Pn and Bn are forwarded to the shaper core 200 to be used along with previous cell grant information from the transmit scheduler 108 to (1) determine if a current cell request should be sent to the scheduler 108 and (2) update the bucket values Bn based on the reverse leaky bucket algorithm, which can be the dual reverse leaky bucket algorithm. On the following cycle, the next sequential VC entry $P_{n+1}$ will be processed and the previous VC bucket value Bn will be written to the bucket storage 204.

Figure 3:
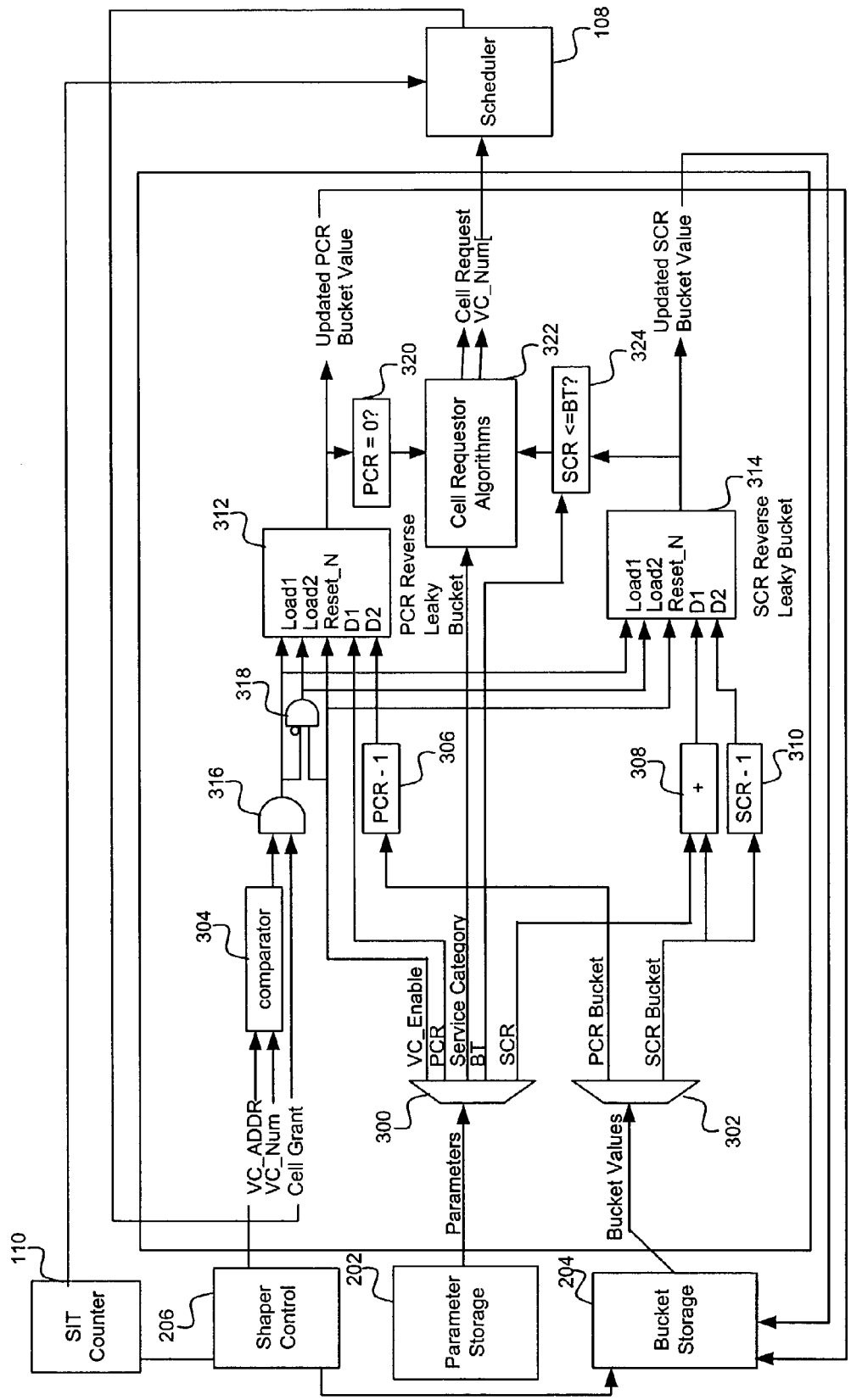
FIG. 3 is a schematic view of the shaper core shown in the shaping device of FIG. 2.

A more detailed diagram of the shaper core 200 is shown in FIG. 3. The shaper core 200 includes input logic, which is a parameter multiplexer 300, a bucket value multiplexer 302, and a comparator 304. The bucket value multiplexer 302 transmits a PCR Bucket signal to a subtractor 306 and an SCR Bucket signal to an adder 308 and a subtractor 310. The adder 308 also receives a SCR signal from the parameter multiplexer 300. The shaper core 200 further includes a PCR Reverse Leaky Bucket counter 312 and a SCR Reverse Leak Bucket counter 214. The PCR counter 312 receives a PCR Bucket signal from the subtractor 306, a PCR signal and a VC_Enable signal from the parameter multiplexer 300, and signals from AND gates 316 and 318. The AND gate 316 receives a signal from the comparator 304, which compares a VC_ADDR signal and a VC_NUM signal, and a Cell Grant signal from the scheduler 108. The AND gate 318 receives a signal from the AND gate 216 and the VC_Enable signal from the parameter multiplexer 300. The SCR counter 314 receives the VC_Enable signal from the parameter multiplexer 300, signals from the AND gates 316 and 318, and signals from the adder 308 and the subtractor 310.

Based on receiving these signals, the PCR counter 312 outputs an updated PCR Bucket Value to the bucket storage 204 and the SCR counter 314 outputs an updated SCR Bucket Value to the bucket storage 204. The updated PCR Bucket Value is also compared to 0 in a comparator 320, which outputs a signal to a cell requester 322. The cell requestor 322 also receives a signal from comparator 324, which compares the updated SCR Bucket Value with a BT value received from the parameter multiplexer 300. Finally, the cell requester 322 receives a QoS service category (CBR, VBR, or UBR) signal from the parameter multiplexer 300. Based on the values from the comparator 320, the comparator 324, and the QoS service category value from the parameter multiplexer 300, the cell requestor 322 performs the reverse leaky bucket algorithm, which can be the dual reverse leaky bucket algorithm. Then the cell requestor 322 outputs a Cell Request signal and a VC_Num signal to the scheduler 108.

The shaper core 200 processing is enabled for 'n' cycles commencing with the occurrence of the SIT pulse SITn. The stored PCR Reverse Leaky Bucket Value is set to the PCR parameter value when a cell request for the current VC has been granted by the scheduler 108 on the previous SIT if the cell grant is determined to be valid, otherwise the bucket value is decremented by one. Also, the stored SCR Reverse Leaky Bucket Value is incremented by the SCR parameter value when a Cell Grant for the current VC is valid, otherwise the bucket is decremented by one. The updated PCR bucket value is compared to zero and the SCR bucket value is compared to BT. The results of these comparisons are sent to the cell requester 322. The cell requestor 322 implements the request algorithms as described in Table 2 and will assert the Cell Request signal along with the requested VC_Number to the scheduler 108. The updated bucket values are also written back to bucket storage 204 the following cycle.

The shaper core 200 as shown in FIG. 3 includes two leaky buckets counters, identified as PCR reverse leaky bucket 312 and SCR reverse leaky bucket 314. On the right hand side of FIG. 3, parameters for each VC and the bucket values Bn are updated and then analyzed in the cell requester 322 to determine whether the buckets are in a state that will allow a cell for that particular VC to be scheduled. The cell scheduling request then goes off to the scheduling module for scheduling.

Figure 4:
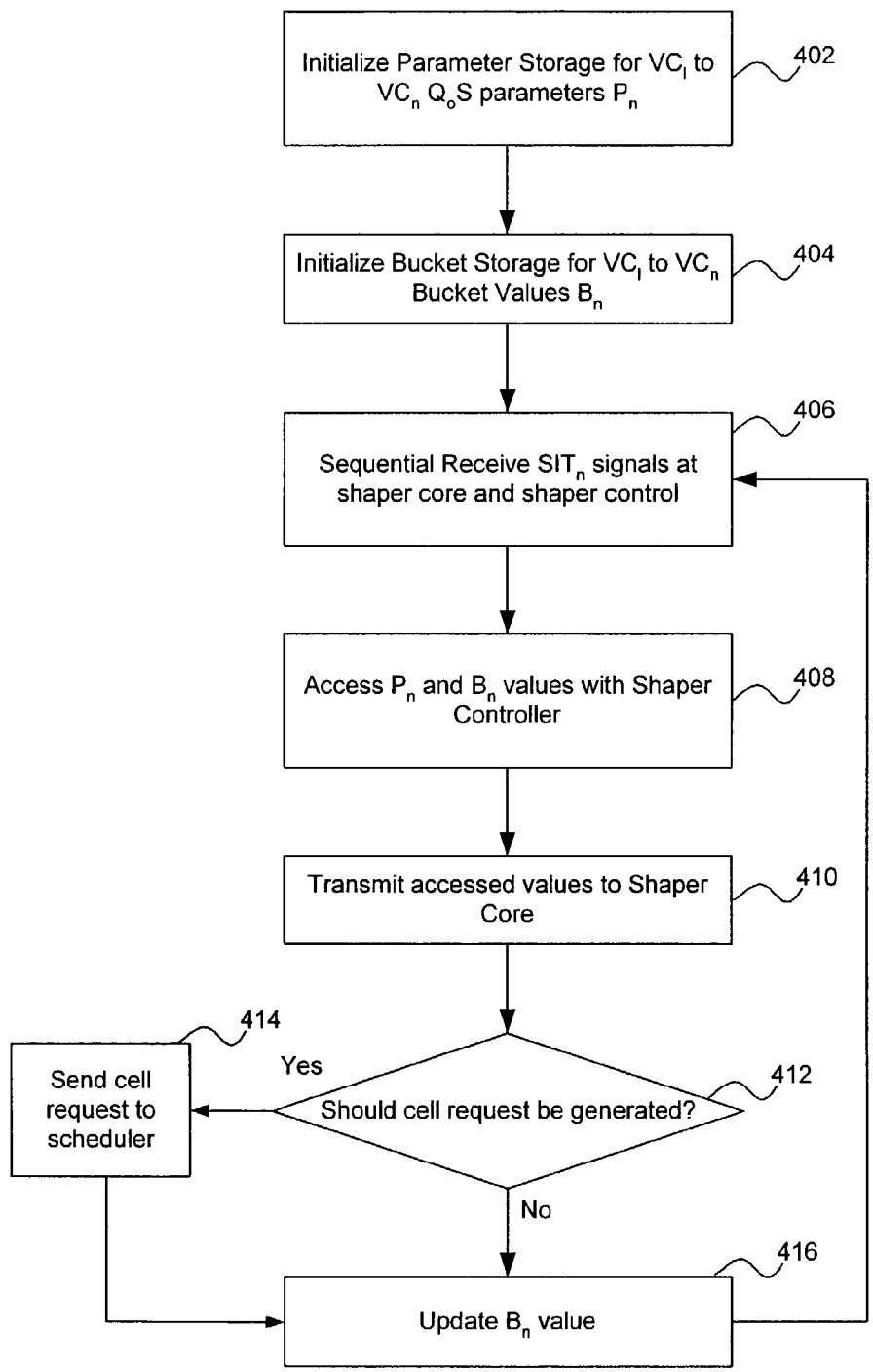
FIG. 4 is a flow chart showing the methods performed by the shaping device in FIGS. 2-3 according to embodiments of the present invention.

A method 400 for traffic shaping using the traffic shaper 106 is shown in FIGS. 4. The host controller 112 initializes the parameter storage values Pn (En, PCR, SCR, BT, QoS Service Category) correlating to n VCs in step 402. The bucket values Bn (SCR bucket value and PCR bucket value) are initialize in step 404. The shaper core 200 and shaper control 206 sequentially receive a SITn signal from the SIT counter 110 at step 406. This SITn signal determines which Pn and Bn values are accessed by the shaper controller 206 in step 408. The accessed Pn and Bn values are transmitted to the shaper core 200 at step 410. At step 412 the shaper core determines whether a cell request should be generated based on performing the leaky bucket algorithm with the received Pn and Bn values, which can be a dual reverse leaky buck algorithm. If yes, the shaper core 200 sends a schedule signal (Cell Request and VC_Number) to a scheduler 108 at step 414. The shaper core then writes updated Bn values (SCR updated bucket value and PCR updated bucket value) to the bucket memory 204 at step 416. If no, the shaper core 200 updates and writes the updated bucket values Bn to the bucket memory 204 at step 416. Following the updating, steps 406-416 are repeated for the n VCs.

Figure 5:
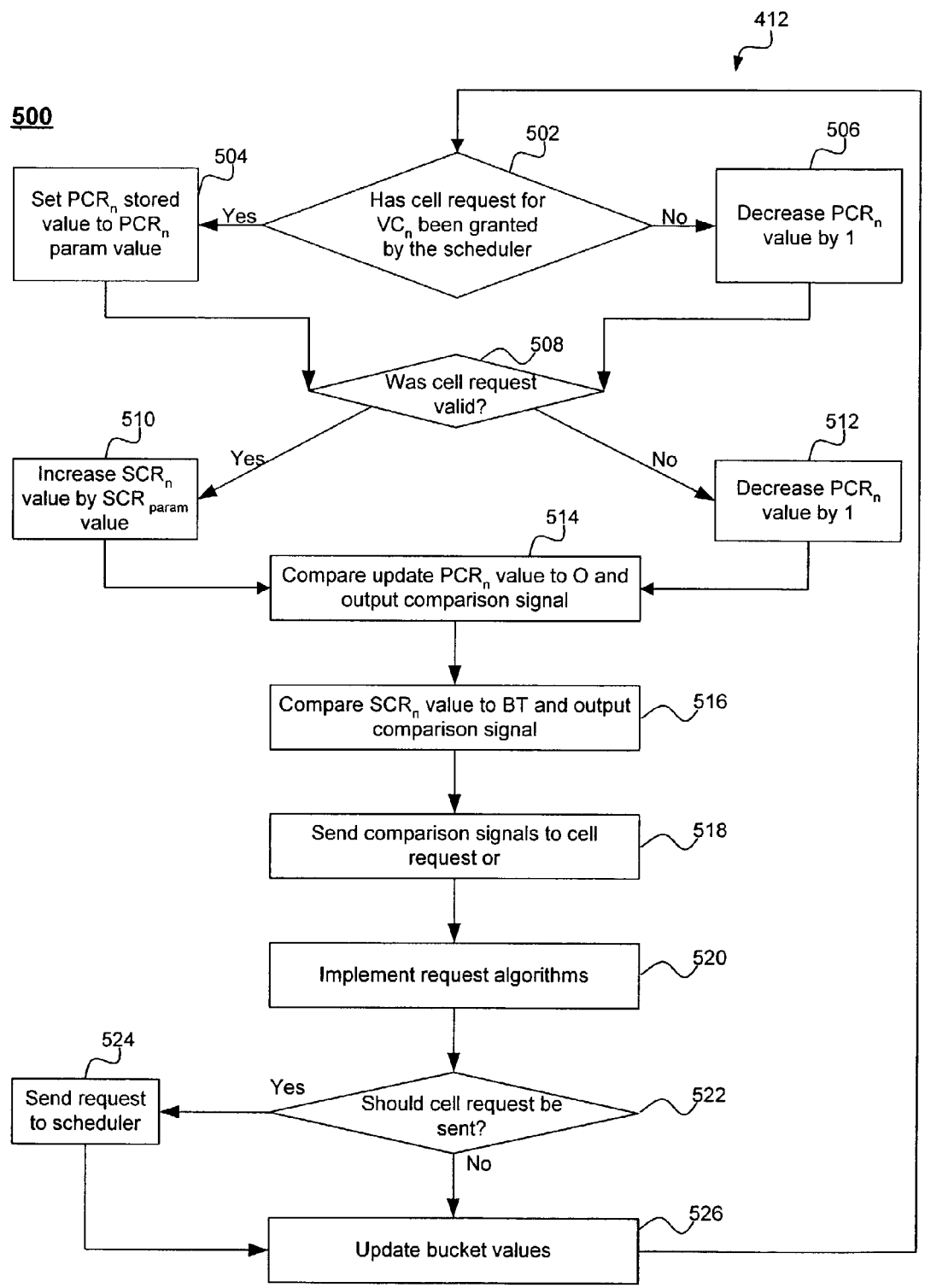
FIG. 5 is a flow chart showing more detailed steps for VBR shaping within a portion of the method in FIG. 4.
Figure 6:
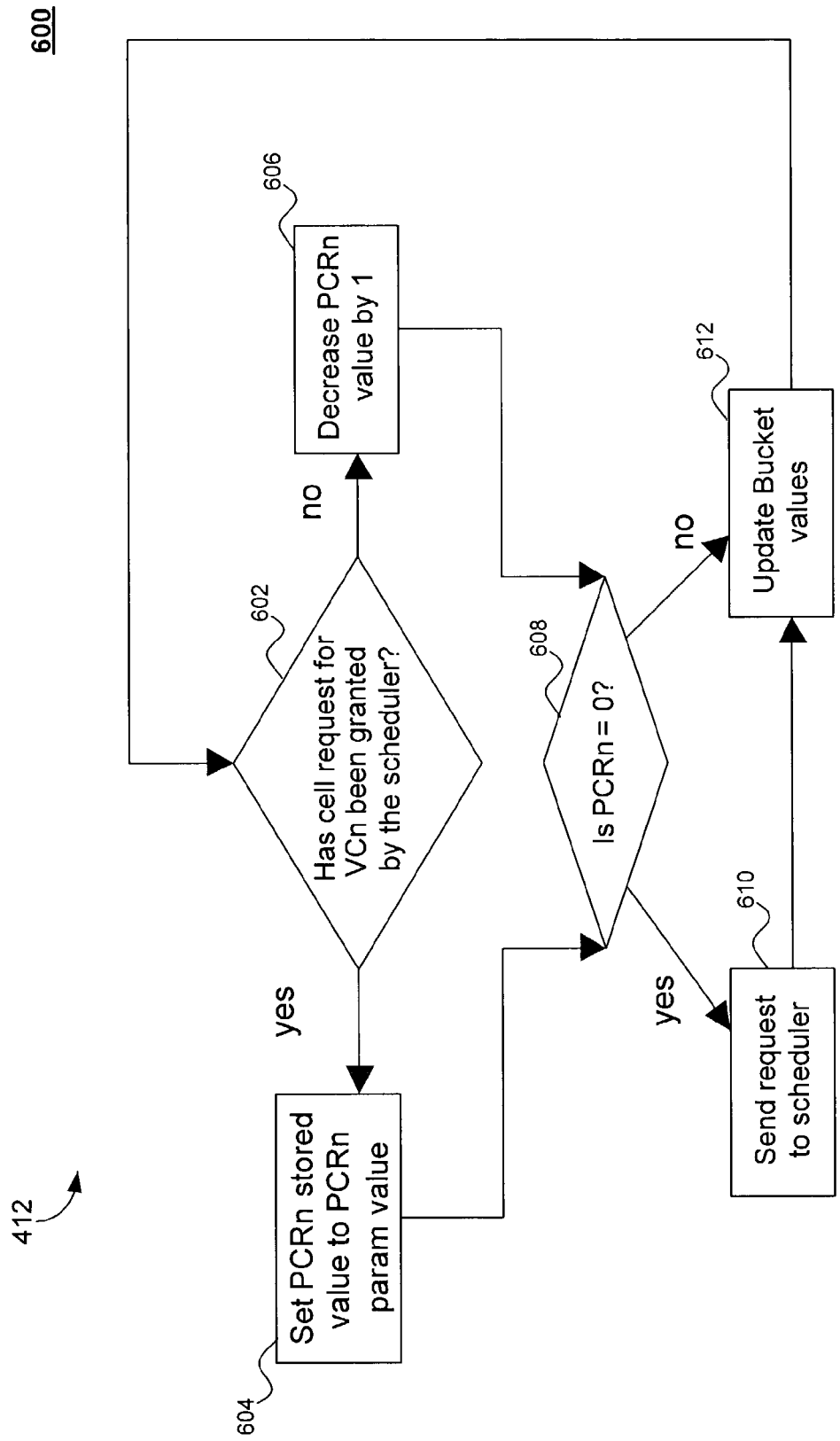
FIG. 6 is a flow chart showing more detailed steps for CBR shaping within a portion of the method in FIG. 4.

FIG. 5 shows a method 500 for VBR shaping occurring during step 412, which is the determination step of whether a cell request should be generated. A similar method can be performed for CBR shaping, which is shown in FIG. 6. At step 502, the shaper core 200, using elements 304, 316, and 318, determines whether a previous cell request for VCn (Cell Grant and VC_Num) has been granted by the scheduler 108. If yes, at step 504 the PCRn stored value is set to the PCRn parameter value using element 312. If no, at step 506 the PCRn value is decreased by 1 using element 312. At step 508, the shaper core 200 determines if the previous cell request was valid. If yes, at step 510 the SCRn value is increased by the SCRn parameter value using element 314. If no, at step 512 the SCRn value is decreased by 1 using element 314. At step 514, the shaper core 200 compares the updated PCRn value to 0 using element 320. At step 516, the shaper core 200 compares the updated SCRn value to a BT value using element 324. At step 518, these compared values are input to the cell requestor. At step 520, the shaper core 200 implements a leaky bucket algorithm. At step 522, the shaper core 200 determines if a cell should be requested based on the outcome of the leaky bucket algorithm. As described above in reference to FIGS. 1B, 1C, and 4, a cell request during VBR shaping is generated when PCR=0 and SCR<BT. If yes, at step 524 a signal (Cell Request and VC_Num) is sent to the scheduler 108 from the requestor 322 to schedule a cell request. At step 526, the bucket values Bn (Updated SCR and PCR Bucket Values) are updated and written to the bucket storage 204 at step 526. If no, the bucket values Bn are updated and written to the bucket storage 204 at step 526. Following the updating, steps 502-526 are repeated for the n VCs.

FIG. 6 shows a method 600 for CBR shaping occurring during step 412, which is the determination step of whether a cell request should be generated. A similar method can be performed for VBR shaping, which is shown in FIG. 5. At step 602, a determination is made whether a cell request for VCn has been granted by the scheduler 108. If yes, at step 604 the PCRn stored value is set to the PCRn param value. If no, at step 606 the PCRn value is decreased by 1. At step 608, a determination is made if PCRn=0. If yes, at step 610 a request is sent to the scheduler 108. After updating the bucket values at step 612 the method returns to step 602. If no, the bucket values are updated at step 612 and the method returns to step 602.

The traffic shaping device 106 can shape transmit data on one or more VCs according to the specified QoS parameters. Thus, the traffic shaper 106 provides for the delivery of associated data cells in accordance with the specified QoS parameters. The traffic shaper 106 is scalable in that it can support almost any number of VCs, and the amount of supported VCs can be increased with a relatively small increase in the size of the storage 202 and 204 and associated logic. The traffic shaper 106 supports CBR, VBR and UBR service types and generates cell transmit requests with zero or substantially zero cell delay variation tolerance (CDVT). The traffic shaper 106 can also provide very high resolution in terms of bit rate specification.

One embodiment of the traffic shaper 106 allows for 32 kilobits per second (kbps) resolution from 32 kbps to 1 megabit per second (Mbps), with more coarse resolution from 1 Mbps up to a maximum transmit bit rate of 84.8 Mbps. Other embodiments of the traffic shaper 106 allow for maximum transmit rates exceeding 622 Mbps. In several embodiments, the shaping resolution is achieved by varying an shaping interval time (SIT), which is done by varying the period between counts in the SIT counter 110. Therefore, both high resolution can be achieved for low bit rates and high bit rates can be achieved through the same traffic shaper 106 for to account for various devices on n VC paths.

The traffic shaper 106 provides for traffic shaping of from 1 to 'n' transmit VCs. Each active VC is initialized with a set of shaping parameters that define the selected service category and parameters as shown in Table 1. Three of the parameters in the table are specified in terms of the Shaping Interval Time (SIT) generated by the SIT counter 110, which is the algorithm update interval timer. The SIT is a variable parameter that occurs at a repetitive rate and starts the shaping process. Table 2 describes the parameters of the Dual Reverse Leaky Bucket algorithm that is implemented by the shaper core.

The size of the BT, PCR and SCR parameters from Table 2 can be configured according to the desired operation of the traffic shaper 106. One embodiment of the traffic shaper 106 uses a 20-bit BT parameter and 12-bit PCR and SCR parameters. In that case, the total number of bits required for defining the shaping parameters is 47 bits for each of the 'n' VCs.

TABLE 1

PER VC SHAPING PARAMETERS

| Shaping Parameters | Size | Description |
|---|---|---|
| Enable | 1 bit | Value of 1 enables Traffic Shaping and cell requests on this VC |
| Shaping Category | 2 bits | Categories include:<br>1. Unspecified Bit Rate (UBR) shaping - generates request to scheduler whenever data is available<br>2. UBR with Peak Cell Rate (PCR) shaping - generates request to scheduler (when data is available) at a rate equal to the selected PCR<br>3. Variable Bit Rate dot 1 (VBR.1) shaping - request to scheduler (when |

TABLE 1-continued

PER VC SHAPING PARAMETERS

| Shaping Parameters | Size | Description |
|---|---|---|
| | | data is available) at a rate equal to the selected PCR-IT as long as the selected Sustained Cell Rate (SCR) has not exceeded the selected burst tolerance.<br>4. Constant Bit Rate (CBR) shaping - generates request to scheduler (when data is available) at a rate equal to the selected PCR |
| Burst Technology (BT) | 'p' bits | Maximum Burst rate in units of Shaping Interval Time* (SIT). This value is used for VBR shaping to determine if a cell request is allowed. |
| PCR Time Increment | 'm' bits | Peak Cell rate (PCR) increment in units of Shaper Interval Time (SIT). |
| SCR Time Increment | 'm' bits | VBR Sustained Cell (SCR) rate increment in units of Shaper Interval Time (SIT). |

The traffic shaper 106 will use the parameters defined for each VC and generate cell transmit requests for each VC based on the state of dual reverse leaky bucket values Bn updated for each VC on each occurrence of the SIT. The state of each bucket value Bn is analyzed along with the availability of data in the source Transmit Queue 104 to determine if a cell transmit request for the source 102 should be made. A description of the implemented Dual Reverse Leaky Bucket algorithms for each QoS service category is described in Table 2.

TABLE 2

REVERSE LEAKY BUCKET OPERATIONAL ALGORITHMS

| Shaping Algorithm | Operational Description |
|---|---|
| CBR | Constant Bit Rate: Uses a single reverse leaky bucket value referred to as the PCR bucket. The PCR bucket value is decremented by 1 every SIT until it reaches zero. If a VC has available data and its PCR bucket value is zero then a cell transmit request is generated for that that VC. Once the request is granted, the PCR bucket value is increased by the Peak Cell Rate Time Increment (PCR) shaping parameter. |
| VBR.1 | Variable Bit Rate: This algorithm uses dual reverse leaky bucket values referred to as the PCR and SCR buckets. Both buckets are decremented by 1 every SIT until they reach zero. If a VC has data available and the PCR bucket value is zero and the SCR bucket it less than or equal to the BT parameter then a transmit request for the VC is generated. This shaping algorithm results in cells requested at the Peak Cell Rate until the Burst Tolerance is exceeded, at which point the scheduling is scaled back to the Sustained Cell Rate. Once the request is granted, the PCR bucket value is increased by the Peak Cell Rate Time Increment (PCR) shaping parameter and the SCR bucket value is increased by the Sustained Cell Rate Time Increment (SCR) shaping parameter. |
| UBR W/PCR | Unspecified Bit Rate with Peak Cell Rate consideration: Basically the same as CBR, but with a lower scheduling priority. |
| UBR WO/PCR | Unspecified Bit Rate without Peak Cell Rate consideration: Generate transmit request whenever data is available. |

Supporting 'n' VCs requires storage of shaping parameters Pn as well as storage of two reverse leaky bucket values Bn (one for PCR and one for SCR) for each VC. The traffic shaper 106 loads the parameters Pn and bucket values Bn for each n VC, one at a time. After the parameters Pn and bucket values Bn are loaded, the traffic shaper 106 updates the bucket values Bn based on the parameters Pn according to results of the scheduling process from the previous SIT occurrence. The updated bucket values Bn are then written back to storage memory 204. By storing parameters Pn and bucket values Bn in memories 202 and 204, respectively, a common set of logic in the shaper core 200, including adders, counters and comparators, can be used to support all 'n' VCs.

As each VC is processed, the traffic shaper 106 compares the updated version of the bucket values Bn with the shaping parameters Pn of the VC to determine if it is time to generate a cell request according to the selected QoS service category. Cell requests for each VC that meet the requirements of the QoS service category are sent to the scheduler 108 that provides scheduling of the highest priority request at the next SIT. The results of the scheduling operation are returned to the traffic shaper 106 to be used to update bucket values Bn according to the algorithm of the selected QoS service category. Thus, the traffic shaper 106 provides a unique hardware implementation of the Dual Reverse Leaky Bucket algorithm along with the ability to vary the cell transmission bit rate in accordance with the QoS requirements.

Another aspect of the traffic shaper 106 is the ability to change the value of the SIT by adjusting the SIT counter 110. As can be seen by the PCR and SCR equations in Table 2, lower SIT values allow for support of higher bit rates with reduced resolution. Higher SIT values allows for support of reduced maximum bit rate, but with higher resolution.

The size (in bits) for each of the PCR, SCR and BT parameters from Table 1 and the bucket values can be varied (in conjunction with the SIT value) to provide more or less resolution and support higher or lower bit rates. SIT values in the range of 1 to 10 microseconds along with 12-bit PCR and SCR parameters provide 32 kbps resolution supporting maximum bit rates in the 10's of megabits per second and minimum bit rates of 20 kbps. The size of the PCR bucket value is equal to the size of the PCR parameter because the value of the PCR bucket value will never exceed that of the PCR parameter. The size of the SCR bucket value is determined based on the desired maximum supported burst capability of the traffic shaper when performing VBR shaping and is the same size as the BT parameter.

CONCLUSION

Example embodiments of the present invention have been described herein. As noted elsewhere, these example embodiments have been described for illustrative purposes only, and are not limiting. Other embodiments are possible and are covered by the invention. Such embodiments will be apparent to persons skilled in the relevant art(s) based on the teachings contained herein. Thus, the breadth and scope of the present invention should not be limited by any of the above-described exemplary embodiments, but should be defined only in accordance with the following claims and their equivalence.

What is claimed is:

1. A system comprising:
   a transmit queue that receives data from traffic sources;
   a traffic shaper coupled to said transmit queue, said traffic shaper comprising a shaper controller, a shaper core, parameter storage, and bucket value storage, said shaper core shaping said data to determine if cell requests can be scheduled based said shaper controller accessing quality of service (QoS) parameter values (Pn) in said parameter storage and bucket values (Bn) in said bucket value storage and controlling their transmission to said shaper core;

a scheduler coupled to said transmit queue and said traffic shaper that schedules transmission of said data to customer premise equipment (CPE) based on receiving cell request signals from said traffic shaper;

a shaping interval time (SIT) counter coupled to said shaper controller and said shaper core, said SIT counter transmitting a signal (SITn) that initiates when said shaper controller accesses said Pn and Bn values; and a host controller coupled to said parameter storage and said scheduler that initializes said parameter storage and said scheduler.

2. The system of claim 1, wherein said traffic shaper is implemented in hardware.

3. The system of claim 1, wherein said SIT counter is implemented in hardware.

4. The system of claim 1, wherein said traffic shaper is comprised of logic devices.

5. The system of claim 1, wherein said traffic shaper implements a Dual Reverse Leaky Bucket algorithm.

6. The system of claim 1, wherein said traffic shaper and said SIT counter are implement in software.

7. The system of claim 1, wherein said traffic shaper is coupled to n virtual circuits (VCs), wherein said bucket storage comprises n memory sections, and wherein one of said n memory sections corresponds to one of said n VCs.

8. The system of claim 1, wherein said traffic shaper is coupled to n virtual circuits (VCs), wherein said parameter storage comprises n memory sections, and wherein one of said n memory sections corresponds to one of said n VCs.

9. The system of claim 1, wherein said Pn value includes at least one of a VC_Enable value, a peak cell rate (PCR) value, a QoS service category value, a burst tolerance (BT) value, and a sustained cell rate (SCR) value.

10. The system of claim 1, wherein said bucket value storage stores peak cell rate (PCR) bucket values and sustained cell rate (SCR) bucket values.

11. The system of claim 1, wherein said traffic shaper is adapted to receive n sequential shaping interval time (SIT) signals of varying values from said SIT counter to individually control a shaping resolution for each of n VCs.

12. The system of claim 1, wherein said traffic shaper has substantially zero cell delay variation tolerance (CDVT).

13. The system of claim 1, wherein said traffic shaper is scalable to accommodate n VCs.

14. The system of claim 1, wherein said shaping core comprises:
a comparator coupled to said scheduler and said shaper controller;
a parameter multiplexer coupled to said parameter storage;
a bucket value multiplexer coupled to said bucket value storage;
a PCR bucket counter coupled to said comparator, said parameter multiplexer, said bucket value multiplexer, and said bucket value storage;
a SCR bucket counter coupled to said comparator, said parameter multiplexer, said bucket value multiplexer, and said bucket value storage; and
a cell requestor coupled to said PCR bucket counter, said SCR bucket counter, and said scheduler.

15. A method of performing traffic shaping with a traffic shaper coupled to n VCs, the method comprising the steps of:
a) sequentially receiving n shaping interval time (SITn) signals in a shaper controller and a shaper core in the traffic shaper;
b) accessing one parameter value (Pn) per SITn signal from a parameter memory;
c) accessing one bucket value (Bn) per SITn signal from a bucket memory;
d) performing a leaky bucket algorithm in said shaper core using said Pn value and said transmitted Bn value;
e) generating a signal identifying whether a cell request should be granted based on said leaky bucket algorithm;
f) generating an updated Bn value in said shaper core based on said leaky bucket algorithm; and
g) replacing a current Bn value with said updated Bn value in said bucket memory.

16. The method of claim 15, further comprising the step of repeating steps a)-g) for n cycles.

17. The method of claim 15, wherein said Pn value includes at least one of a VC_Enable value, a peak cell rate (PCR) value, a QoS service category value, a burst tolerance (BT) value, and a sustained cell rate (SCR) value.

18. The method of claim 15, wherein said Pn value includes at least one of a PCRn and SCRn bucket value.

19. The method of claim 15, wherein if a cell request should be granted, the method further comprises the step of transmitting a signal to a scheduler to schedule a cell request.

20. The method of claim 15, wherein step e) further comprises the steps of:
e1) determining whether a previous cell request for VCn was granted and updating said Bn value based on said determination;
e2) determining, if said previous cell request was granted, whether said granted previous cell request was valid and updating said Bn value based on said determination;
e3) comparing said updated Bn value to a predetermined value to generate a comparison signal; and
e4) determining, based on said comparison signal, whether said present cell request should be granted;
wherein after step e4) said generated signal is generated.

21. The method of claim 15, wherein step e) further comprises the steps of:
e1) determining whether a previous cell request for VCn was granted and updating said Bn value based on said determination;
e2) comparing said updated Bn value to a predetermined value to generate a comparison signal; and
e3) determining, based on said comparison signal, whether said present cell request should be granted;
wherein after step e3) said generated signal is generated.

22. The method according to claim 15, further comprising the step of controlling said SITn signal such that there is substantially zero CDVT.

23. The method according to claim 15, further comprising the step of varying one of said SIT signals to vary a shaping resolution for a corresponding one of said n VCs.

24. A traffic shaper in an asynchronous transfer mode (ATM) network, said traffic shaper comprising:
a shaper controller;
a shaper core coupled to said shaper controller;
parameter storage coupled to said shaper controller and said shaper core; and bucket storage coupled to said shaper controller and said shaper cores
wherein said shaper core comprises.
   a comparator coupled to said shaper controller,
   a parameter multiplexer coupled to said parameter storage.
   a bucket value multiplexer coupled to said bucket value storage.
   a PCR bucket counter coupled to said comparator, said parameter multiplexer, said bucket value multiplexer, and said bucket value storage,
   a SCR bucket counter coupled to said comparator, said Parameter multiplexer, said bucket value multiplexer, and said bucket value storage, and
   a cell requestor coupled to said PCR bucket counter and said SCR bucket counter.

25. The traffic shaper of claim 24, wherein said shaper controller, said shaper core, said parameter storage, and said bucket storage are implemented in hardware.

26. The traffic shaper of claim 25, wherein said hardware implementation utilizes logic devices.

27. The traffic shaper of claim 24, wherein said shaper controller, said shaper core, said parameter storage, and said bucket storage are implemented in software.

28. The traffic shaper of claim 24, wherein said shaper controller, said shaper core, said parameter storage, and said bucket storage result in substantially zero CDVT.

29. The traffic shaper of claim 24, wherein said parameter storage and said bucket storage are scalable to accommodate n VCs.

* * * * *

UNITED STATES PATENT AND TRADEMARK OFFICE
CERTIFICATE OF CORRECTION

| | | |
|---|---|---|
| PATENT NO. | : 7,339,890 B2 | Page 1 of 1 |
| APPLICATION NO. | : 10/195528 | |
| DATED | : March 4, 2008 | |
| INVENTOR(S) | : Daniel J. Burns | |

It is certified that error appears in the above-identified patent and that said Letters Patent is hereby corrected as shown below:

Title Page
Item (56), References Cited, U.S. PATENT DOCUMENTS please replace "7,117,963" with --7,177,963--.

Signed and Sealed this

Tenth Day of June, 2008

JON W. DUDAS
*Director of the United States Patent and Trademark Office*